United States Patent [19]
Jeong et al.

[11] Patent Number: 5,151,874
[45] Date of Patent: Sep. 29, 1992

[54] INTEGRATED CIRCUIT FOR SQUARE ROOT OPERATION USING NEURAL NETWORK

[75] Inventors: Ho-sun Jeong; Hyo-jin Han, both of Taegu, Rep. of Korea

[73] Assignee: Samsung Electronics Co., Ltd., Suwon, Rep. of Korea

[21] Appl. No.: 617,813

[22] Filed: Nov. 26, 1990

[30] Foreign Application Priority Data

Apr. 3, 1990 [KR] Rep. of Korea ................. 90-4516

[51] Int. Cl.⁵ .................................. G06F 7/552
[52] U.S. Cl. ................................... 364/752
[58] Field of Search ...................... 364/752, 748

[56] References Cited

U.S. PATENT DOCUMENTS 4,336,599 6/1982 Wong .......................... 364/752

OTHER PUBLICATIONS

Rutter, "Direct Extraction of a Binary Floating Point Square Root" *IBM Tech. Disclosure Bulletin*, vol. 14, No. 10, Mar. '72, pp. 3157-3159.
Murphy et al, "Square-Root Procedure for Binary Floating-Point Numbers" *IBM Tech. Disclosure Bulletin*, vol. 21, No. 2, Jul. 1978, p. 785.

*Primary Examiner*—David H. Malzahn
*Attorney, Agent, or Firm*—Cushman, Darby & Cushman

[57] ABSTRACT

An integrated circuit for performing a square root operation uses adders made in accordance with neural network concepts. The integrated circuit includes an exponent part, a first mantissa part, a second mantissa part and a control part. The exponent part computes an exponent of the square root of an input operand; the first mantissa part preprocesses the mantissa of the input operand; the second mantissa part computes the square root of the output from the first mantissa part; and the control part controls interaction of input and output among various components of the integrated circuits. Because the adders used in integrated circuit are composed of neural network circuits having a short propagation time for carry bits, the integrated circuit can computer a square root fast and efficiently.

13 Claims, 6 Drawing Sheets

INTEGRATED CIRCUIT FOR SQUARE ROOT OPERATION USING NEURAL NETWORK

BACKGROUND OF THE INVENTION

Field of the Invention

The present invention relates to an integrated circuit for fast computation of square roots and is implemented by an adder and by using the neural network concept.

BACKGROUND OF THE INVENTION

Generally digital signal processors (DSPs) are used in digital communications and sound processing. In these areas, because most frequently executed operations of DSPs consist of multiplication and addition, DSPs are developed for fast computation of the aforementioned arithmetic operations. In addition, DSPs are also designed for fast computation of division and subtraction. However, recent applications for DSPs demand efficient execution of not only the basic arithmetic operations, but also more sophisticated functions such as evaluating square roots. For example, a servo control system for robots would require calculations related to positioning of the robots, which, in turn, would require efficient computation of square roots. However, conventional DSPs do not perform these other operations rapidly.

Up to now, conventional adders have been used in VLSI implementations of algorithms for computing a square root. However, such implementations have drawbacks, because the required circuit layout for the adder is complicated and because the adder is slow. The present invention overcomes the drawbacks of conventional DSPs by using an adder which is implemented by a neural network of a unidirectional feedback type model. The adder of the present invention is not a full-adder, but rather a combination of, for example, 2-bit and 3-bit adders that are implemented using a neural network.

SUMMARY OF THE INVENTION

It is the principal object of the present invention to provide an integrated circuit design for fast computation of square roots by using adders, designed in accordance with the neural network concept and according to the algorithm proposed by Kenji Ogura and Takakazu Kurokawa in "The VLSI Implementation of Binary Square Root," JTC-CSCC, Japan 1989. The present invention, comprising a 2-bit adder and a 3-bit adder, can perform a square rooting function faster than circuits designed with full-adders. To accomplish the object, the present invention comprises an integrated circuit for performing a square root operation which can perform the operation faster than a conventional full-adder. The present invention uses a 2-bit adder, a 3-bit adder and a 4-bit adder manufactured by the concept of a neural network, as disclosed in South Korean patent application 89-1369, filed on Feb. 2, 1989 and its corresponding U.S. patent application 07/473,654 filed on Feb. 1, 1990 which was allowed on Nov. 13, 1990, now U.S. Pat. No. 5,016,211, and is incorporated herein by reference.

Algorithms for calculating square roots will now be explained. The square root of a decimal number can be calculated using the following steps.

(1) Group the operand digits into pairs of digits, but never with a decimal point between the digits of a pair.

(2) Write down the largest number whose square is less than the leftmost pair, that is, the first pair. This number is the first digit of the square root being computed.

(3) Subtract the square of the digit found in step (2) from the first pair, and concatenate its result to the left side of the second pair of digits to obtain the number b.

(4) Let $a = $ [the answer-so-far] $\times 10$. Divide the concatenated number b obtained from the previous step by $2a$.

Let $c = $ [the whole number quotient of the preceding division]. Concatenate c to the right side of the answer-so-far to obtain the number d.

(5) Subtract $2ac$ and $c^2$ from the concatenated number b determined in step (3), and concatenate the next pair of digits to the right side of the subtraction result. If the subtraction result is negative, repeat this step with the value of c reassigned to c-1.

(6) Repeat steps (4) through (5) until the answer attains the required accuracy.

For example, use of the algorithm for obtaining the square root of 123,456 is as follows.

$$\begin{array}{r} 3 \quad 5 \quad 1 \\ \sqrt{12\ 34\ 56} \end{array}$$

$\underline{-9} \qquad \leftarrow 12 - 3^2$ $\phantom{-}3\ 34 \qquad \leftarrow 1234 - 30^2$ $\phantom{00000} (a = 30)$ $\phantom{00000} (c = 334 \div (2 \times 30) = 5)$ $-3\ 00 \qquad \leftarrow 2ac = 2 \times 30 \times 5$ $\underline{-\phantom{00}25} \qquad \leftarrow c^2 = 5^2$ $\phantom{-0}9\ 56 \qquad \leftarrow 123456 - 350^2$ $\phantom{00000} (a = 350)$ $\phantom{00000} (c = 956 \div (2 \times 350) = 1)$ $-\phantom{0}7\ 00 \qquad \leftarrow 2ac = 2 \times 350 \times 1$ $\underline{-\phantom{000}1} \qquad \leftarrow c^2 = 1^2$ $\phantom{-0}7\ 55 \qquad \leftarrow 123456 - 351^2$ (1) First, group the digits into pairs, in this example the first pair is 12.

(2) Second, since the number whose square is less than 12 is 3, the leftmost digit of the square root being computed is also 3.

(3) Next, subtract 9 ($3^2$ from 12, and concatenate the second pair 34 to 3, obtaining b=334.

(4) Determine the value of "a" using the formula given above, i.e., $a = $ [the answer-so-far] $\times 10$ which equals $3 \times 10$ or 30. Then divide the concatenated number obtained in step (3), b=334, by 2a which equals 60 to obtain c, which is the whole number quotient. In this example $c = 334 \div 60$ or 5. Then concatenate 5 to the right side of the answer-so-far to obtain 35.

(5) Subtract 2ac, which equals $2 \times 30 \times 5$ or 300, and $c^2$, which equals $5 \times 5$ or 25, from the concatenated number 334 which was obtained in step (3). The subtraction result thus becomes 9 (334-300-25). The next pair of digits 56 is then concatenated to the right side of the subtraction result yielding 956.

(6) The above steps (4) through (5) are now repeated using a=350 (35×10), b=956 and c=1 (956÷700). Subtracting 2a (700) and $c^2(1)$ from 956 leaves 255 and the square root answer becomes 351.

In step (4), a=[the answer-so-far]×10. The answer-so-far is multiplied by 10 because one digit of the square-root being computed is 10 times bigger than the next digit on its right side. In step (5), the result of subtracting 2ac and $c^2$ yields a number equal to (a+c)×10. Thus, the above algorithm is based on the formula $(a+c)^2 = a^2 + 2ac + c^2$.

Another example of using the above algorithm is shown below.

```
       3  5
    ┌─────────
  √ │ 1 2  2 3  3 4
    - 9              ← 12 - 3²
    ─────
      3 2 3          ← 1233 - 30²
                     (a = 30)
                     (c = 323 ÷ (2 × 30) = 5)

-   3 0 0        ← 2ac = 2 × 30 × 5
    -     2 5        ← c² = 5²
    ─────────
    can't subtract 3  4  9
    ┌─────────
  √ │ 1 2  2 3  3 4
    - 9              ← 12 - 3²
    ─────
      3 2 3          ← 1223 - 30²
                     (a = 30)
                     (c = 4)

-   2 4 0        ← 2ac = 2 × 30 × 4
    -     1 6        ← c² = 4²
    ─────────
      6 7 3 4        ← 122334 - 340²
                     (a = 340)
                     (c = 6734 ÷ (2 × 340) = 9)

-   6 1 2 0      ← 2ac = 2 × 340 × 9
    -       8 1      ← c² = 9²
    ─────────────
          5 3 3      ← 122334 - 349²
```

In the above example, when the second digit of the answer is calculated as 323÷(2×30), if c is regarded as 5, values 300 and 25 cannot both be subtracted from the concatenated number 323 without yielding a negative number. So step (5) has to be repeated with c reduced by one to 4.

The computing steps for a binary number are similar to that for a decimal number. To derive an algorithm for computing a binar square root, all steps in the above algorithm which involve multiplication by 10 must be replaced by steps that involve multiplication by 2. For example, a=[answer-so-far]×10 in the above algorithm. This now becomes:

a = [answer-so-far] × 2
      = [the answer-so-far shifted one bit to the left]
      = [the answer-so-far concatenated with "0" to its right].

An example of computing a square root of a binary number is shown below. In the example, all numbers shown except integer 2, are in binary notation (i.e., 1000=8).

```
         1 1 0 1
      ┌─────────────
    √ │10 11 00 10
      -1                ← a² - 1²
      ─────
       1 11             ← 1011 - 10²
                        (a = 10)
                        (c = 111 ÷ (10 × 10) = 1)

-1 0 0            ← 2ac = 10 × 10 × 1
      -    1            ← c² = 1²
      ─────
       1 0 0 0          ← 101100 - 110²
                        (a = 110)
                        (c = 1000 ÷ (10 × 110 = 0)

-       0         ← 2ac = 10 × 110 × 1
              0         ← c² = 0²
      ─────────
       1 0 0 0 1 0      ← 10110010 - 1100²
                        (a = 1100)
                        (c = 100010 ÷ (10 × 1100) = 1)

- 1 1 0 0 0       ← 2ac = 10 × 1100 × 1
      -       1         ← c² = 1²
      ─────────
         1 0 0 1        ← 10110010 - 1101²
```

Another example similar to the second example shown for the decimal square root operation is shown below.

```
          1  1
       ┌─────────
     √ │10 00 10 10
       -1                 ← a² = 1²
       ────
        1 00              ← 1000 - 10²
                          (a = 10)
                          (c = 100 ÷ 100) = 1)

-1 0 0             ← 2ac = 100 × 1
       -   1              ← c² = 1²
       ─────────
       can't subtract 1  0  1  1
       ┌─────────────
     √ │10 00 10 10
       - 1                 ← a² = 1²
       ────
         1 0 0             ← 1000 - 10²
                           (a = 10)
                           (c = 100 ÷ 100 = 0

-     0             ← 2ac = 100 × 0
       -     0             ← c² = 0²
       ─────────
         1 0 0 1 0         ← 100010 - 100²
                           (a = 100)
                           (c = 10010 ÷ 1000 = 1)

- 1 0 0 0           ← 2ac = 1000 × 1
       -     1             ← c² = 1²
       ─────────
         1 0 0 1 1 0       ← 10001010 - 1010²
                           (a = 1010)
                           (c = 100110 ÷ 10100 = 1)

- 1 0 1 0 0         ← 2ac = 10100 × 1
       -         1         ← c² = 1₂
       ─────────────
         1 0 0 0 1         ← 10001010 - 1010²
```

In this example, it is clear that c is either 1 or 0. Thus, if c=0, $2ac+c^2=0$. And if c=1, $$2ac + c^2 = 2a + 1$$
$$= [\text{the answer-so-far 2-bit shifted to the left}] + 1$$
$$= [\text{the answer-so-far concatenate with}$$
$$\text{"01" to the right}]$$

Thus, in the case of a binary square root operation, c can be found by testing if the following inequality is satisfied:

[the result of step (5)]−[the answer-so-far concatenated with "01" to its right]≧0.

If the preceding inequality is satisfied, c is equal to 1; otherwise, c is equal to 0.

To evaluate the square root of a floating point binary number, separate calculations need be made for its mantissa and its exponent. If the value of its exponent is an even number, a proper exponent for the root is found by dividing the exponent of operand by 2. In a shift register, this is equivalent to shifting the original exponent by one bit to its right.

If the value of its exponent is an odd number, then its mantissa should be one-bit shifted to the right and its exponent incremented by one, making the exponent even, so that the preceding algorithm can be applied.

Let an odd exponent of a floating point number be represented by $2K+1$ where K is an integer. Adding 1 to the exponent and shifting one-bit to the right is equivalent to $[(2K+1)+1]+2=K+1$. Shifting one-bit to its right before adding 1 to the exponent is equivalent to $[(2K+1)+2]+1=K+1$, as same as the previous result. Thus the order of the two operations, shifting and adding, are interchangeable.

For both even or odd exponents, the correct value of the exponent can be calculated by first shifting the exponent by one to its right, and second by adding the least significant digit of the original exponent to the shifted value.

BRIEF DESCRIPTION OF THE DRAWINGS

An integrated circuit for computing a square root will be described in detail with reference to accompanying drawings, wherein.

DESCRIPTION OF THE PREFERRED EMBODIMENT OF THE INVENTION

Figure 1:
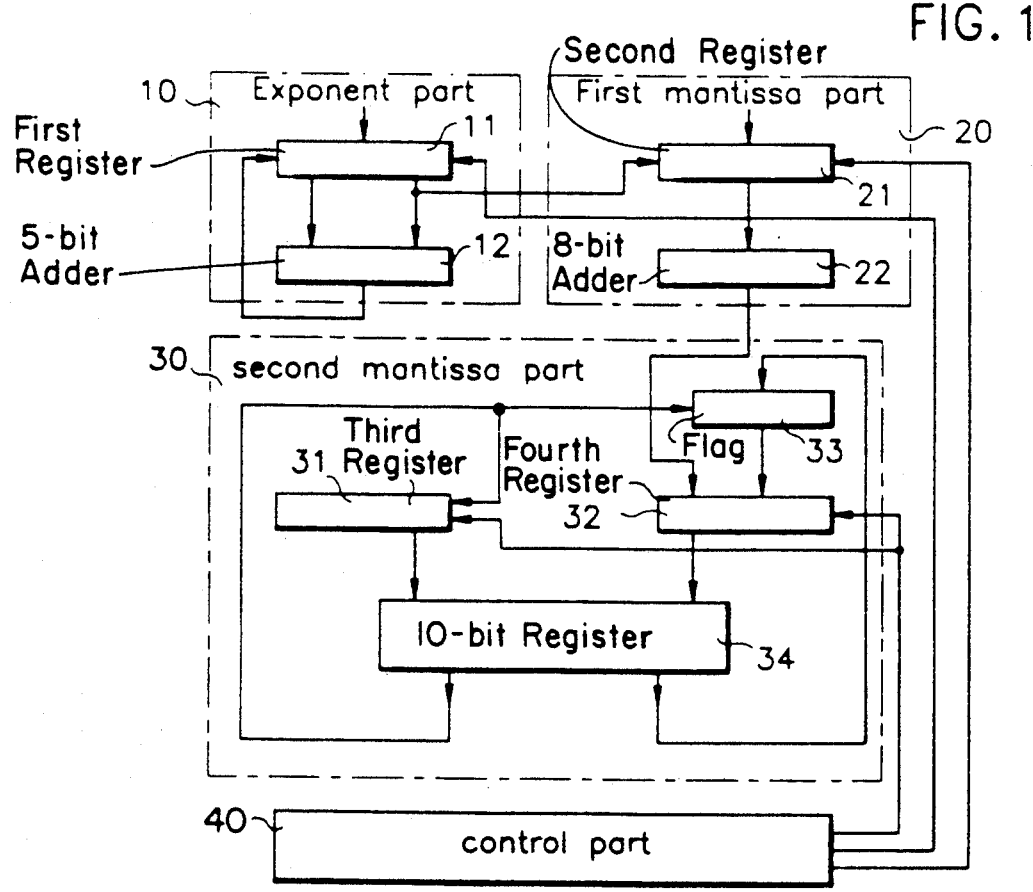
FIG. 1 represents an overall block diagram showing one embodiment of an integrated circuit for computing square roots according to the present invention.

FIG. 1 depicts an overall block diagram showing one embodiment of an integrated circuit for a square root operation according to the present invention.

As shown in FIG. 1, an integrated circuit for a square root operation comprises exponent part 10, first mantissa part 20, second mantissa part 30 and control part 40. In FIG. 1, 6-bit data are inputted to exponent part 10 and 8-bit data are inputted to first mantissa part 20 and second mantissa part 30.

Exponent part 10 comprises first register 11 and 5-bit adder 12, and stores a computed exponent of a square root in first register 11. The mantissa part comprises first mantissa part 20 for performing a preliminary square rooting operation and second mantissa part 30 for performing the actual square rooting operation.

First mantissa part 20 subtracts 1000000, from the operand, and comprises second register 21 and 8-bit adder 22.

Second mantissa part 30 comprises third register 31, fourth register 32, flag 33 and 10-bit adder 34. Second mantissa part 30 operates on the output from first mantissa part 20 and is the principal part for square rooting the mantissa. The result from second mantissa part 30 is stored in third register 31.

Figure 2:
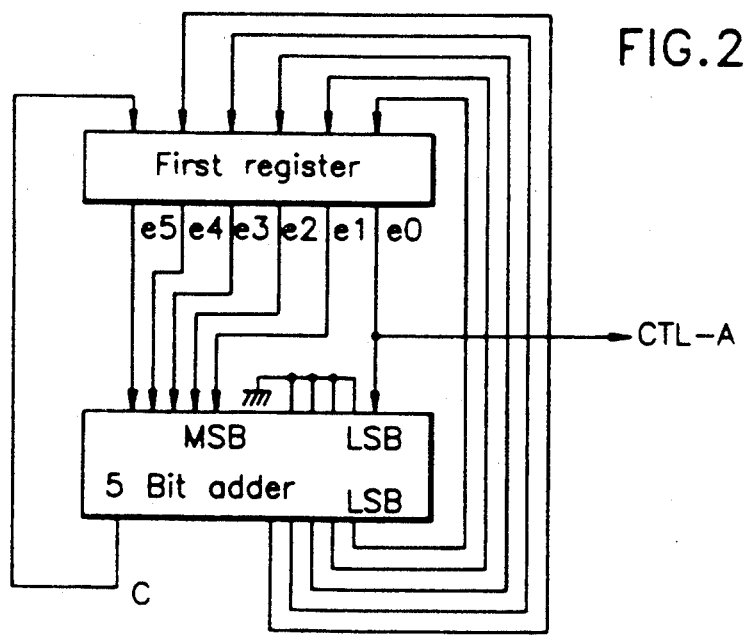
FIG. 2 shows a detailed block diagram of the exponent part of FIG. 1.

FIG. 2 shows a detailed block diagram of exponent part 10 and depicts the input/output relationship between 5-bit adder 12 and first register 11, which both have 6-bit parallel inputs and outputs. The least significant bit of the exponent is transmitted to second register 21 of first mantissa part 20 by control signal CTL-A. In other words, control signal CTL-A is at a "1" or "0" level depending on the value of the least significant bit of the exponent.

Figure 3:
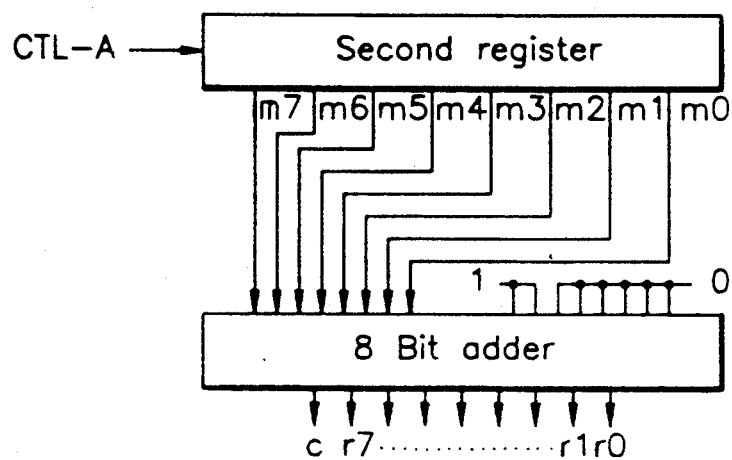
FIG. 3 shows a detailed block diagram of the first mantissa part of FIG. 1.

FIG. 3 shows a detailed block diagram of first mantissa part 20 which performs the preliminary square rooting operation. In operation, the value of the mantissa component for performing the square root operation is stored in second register 21. If the value of the exponent is odd, that is the least significant bit of the exponent is "1", then the content of second register 21 is 1-bit shifted to the right by the CTL-A signal which is "1".

Pairing the operand digits according to the square rooting algorithm described above will always yield a first bit pair that has the value of either "10" or "11." Thus, prior to shifting the digits stored in the second register, the most significant bit is assumed to be equal to "1." This allows for quick execution of steps required for computing the square root of a binary number. Thus, subsequent to the shifting operation, "1000000" is subtracted from the previous result via 8-bit adder 22.

Figure 4:
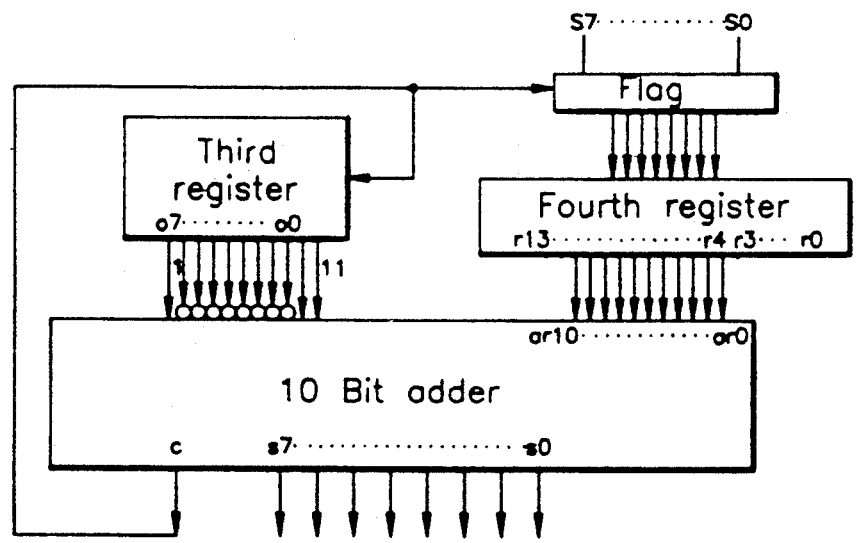
FIG. 4 shows a detailed block diagram of the second mantissa part of FIG. 1.

FIG. 4 shows a detailed block diagram of second mantissa part 30. Third register 31 stores the computation result performed by second mantissa part 30 and initially contains the value "1." Fourth register 32 receives data from 8-bit adder 22 of first mantissa part 20. Whenever steps (4) and (5) of the aforementioned binary square rooting algorithm are about to be iterated, the result stored in the third and fourth registers are 1-bit and 2-bit shifted to the left, respectively. The flag 33 indicates if the carry C of 10-bit adder is at a "1" or "0."

In second mantissa part 30, the binary square root algorithm suitable for hardware implementation is executed as follows. Let "the next pair" designate a pair of digits that is concatenated to a number during the very last execution of a procedure corresponding to step (5) of the aforementioned binary rooting algorithm. Perform the following subtraction: [the number concatenated with "the next pair"]−[the answer-so-far concatenated with "01" to its right]. If the result is greater than or equal to zero, concatenate "1" to the right of the answer-so-far; otherwise, concatenate "0" to the right of the answer-so-far. Concatenate the pair of digits to the right of "the next pair" to the result of the subtraction. This number now becomes [the number concatenated with "the next pair"], where "the next pair" now designates the last pair concatenated. Iterate the preceding process until an 8-bit answer-so-far is computed.

Figure 5:
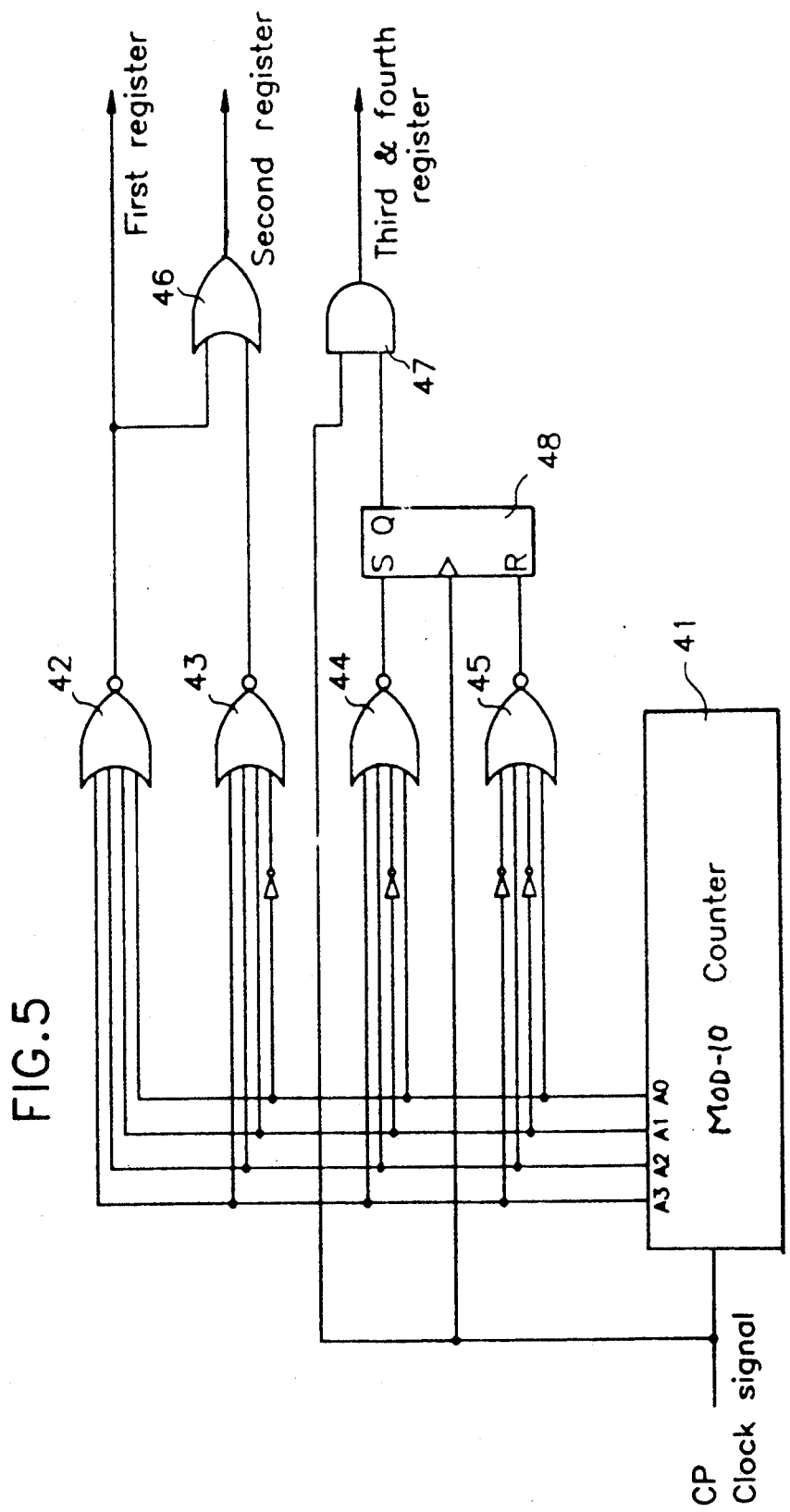
FIG. 5 shows a detailed block diagram of the control part of FIG. 1.

FIG. 5 shows a detailed block diagram of the control part shown in FIG. 1. Control part 40 comprises the MOD-10 counter 41 and S-R flip-flip 48, both of which are clocked by signal CP. Control part 40 controls the timing of input and output of the registers 11, 21, 31, and 32.

When signal CP resets MOD-10 counter 41, NOR gate 42 transmits an "1" to the first register and the second register. In response, the first register loads in the exponent of an input operand and stores the output of the exponent part 10. For the next nine clock cycles, the first register will simply hold its value. Consequently, the second register fetches the mantissa of the input operand and tries to shift the mantissa one bit to its right. Whether the second register can shift or not depends on the value of the least significant bit of the first register. When MOD-10 counter 41 increments to one, NOR gate 43 outputs an "1" to the second register. The value of the second register is transmitted to the fourth register via the 8-bit adder. When MOD-10 counter 41 increments to two, the output of NOR gate 44 drives the third and fourth registers. Consequently, the third and fourth registers latch in a set of "1s" and the preprocessed data from the first mantissa part. Thereafter, for the next eight clock cycles, the third and fourth registers hold intermediate values used in computing the square root of the preprocessed data. At the eleventh clock cycle, the first and the third registers output the exponent and the mantissa of the computed square root. At the same time, the square root circuit begins computing the square root of another number.

Figure 6A:
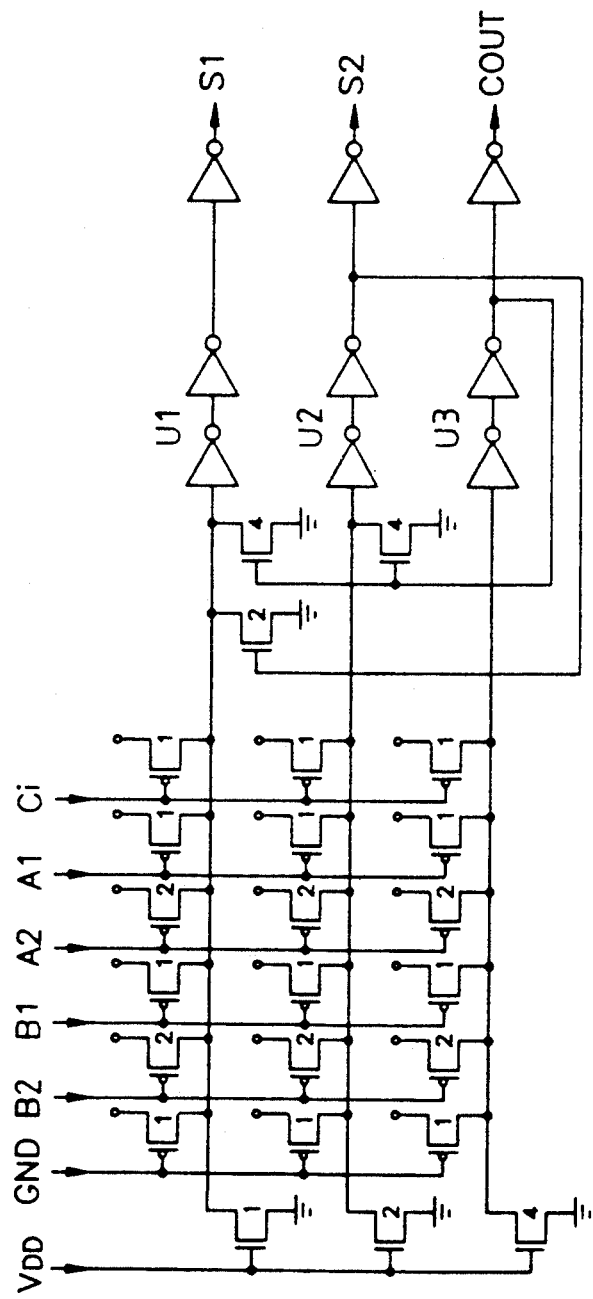
FIG. 6A, FIG. 6B, and FIG. 6C represent circuit diagrams of a 2-bit adder, a 3-bit adder, and a 4-bit adder implemented by using the neural network concept.
Figure 6B:
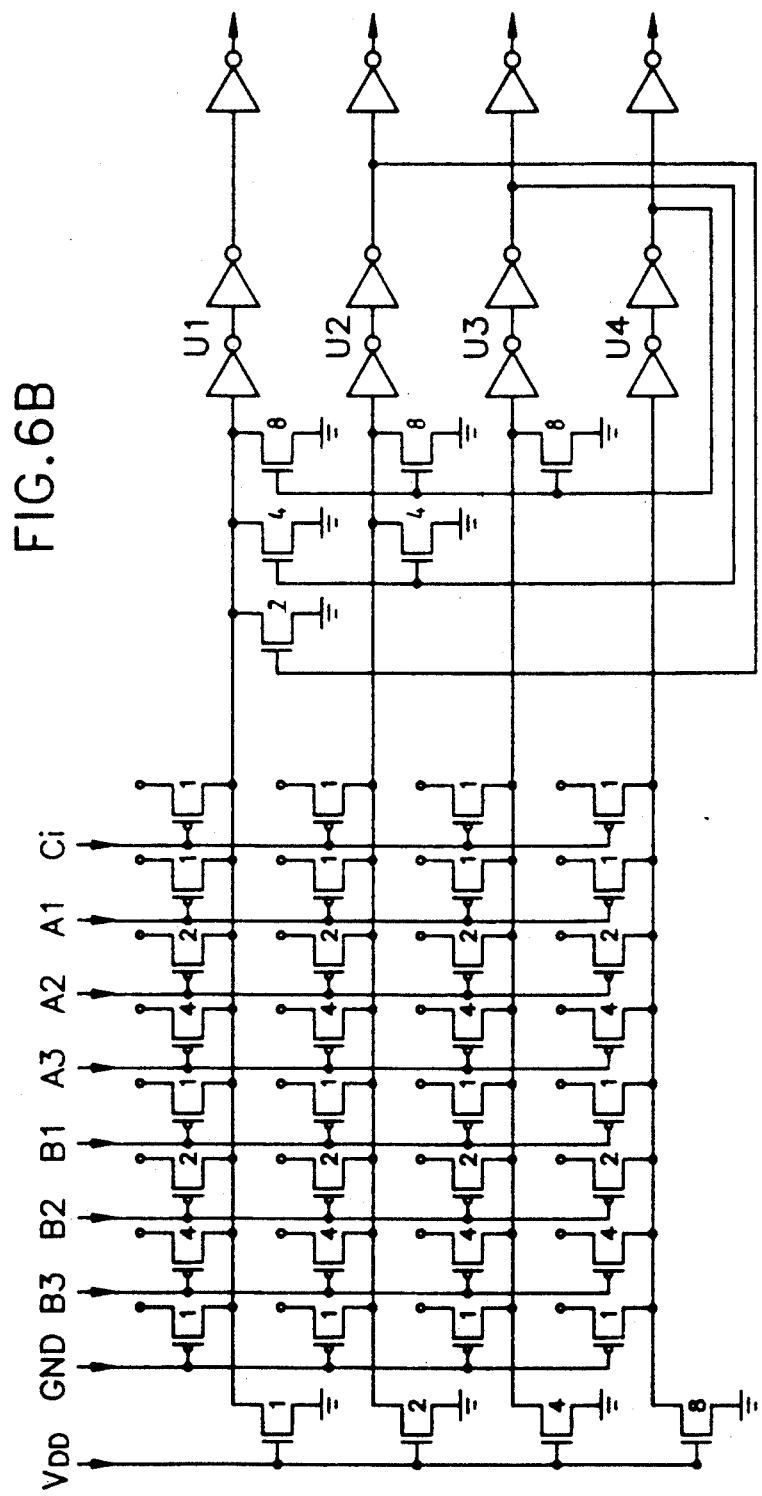
Figure 6C:
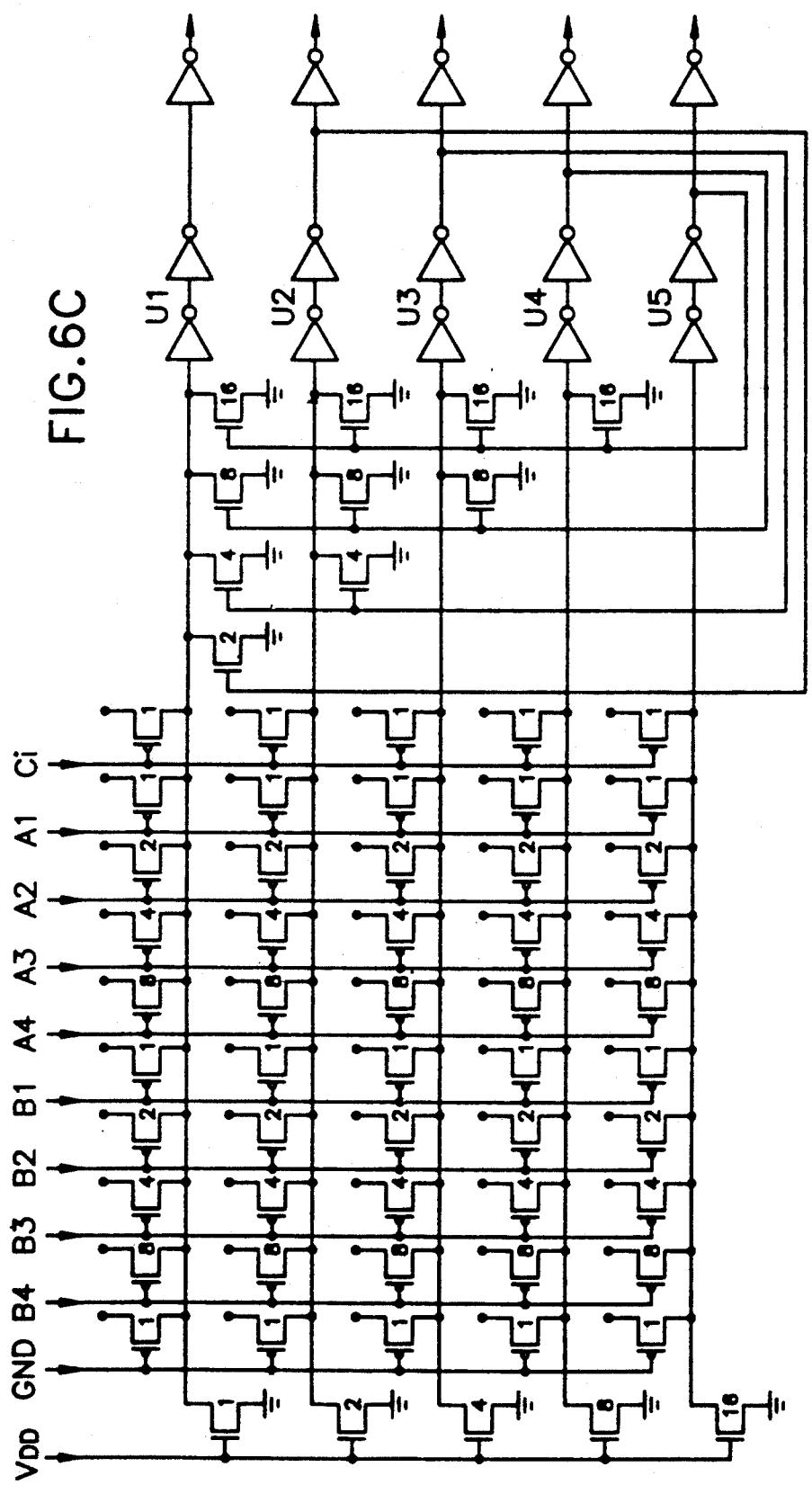

FIGS. 6A, 6B, 6C are circuit diagrams of a 2-bit adder, a 3-bit adder, and a 4-bit adder, respectively. They are implemented using the neural network concept. A 5-bit adder, an 8-bit adder and a 10-bit adder can be easily constructed by an appropriate combination of the 2-bit adder and the 3-bit adder shown in FIGS. 6A and 6B.

As shown in FIGS. 6A–6C, the 2-bit adder, the 3-bit adder, and the 4-bit adder each comprise:

an input synapse composed of PMOS transistors to which the augend, the addend, and the carry are inputted;

a first bias synapse composed of NMOS transistors, to which a first voltage is applied, and an output part which includes inverters and buffer amplifiers composed of CMOS inverters;

a second bias synapse composed of PMOS transistors to which a second voltage (i.e., ground potential) is applied; and a feedback synapse composed of NMOS transistors.

Increasing the number of digits of the augend and the addend by 1 also increases by 1 the number of groups of buffer amplifiers and output synapses.

The connecting strength of the input synapse corresponds to the weight of each input bit. The weight of each terminal is loaded to each input line by the first bias synapse. The connecting strength of the feedback synapse, which feeds the output of the upper bit buffer amplifier to each input line of the lower bit buffer amplifier, is established with the corresponding weight of the upper bit. For example, in the 2 bit adder shown in FIG. 6A, the carry bit has a value of decimal 4 and so the feedback synapse to the lower bits is weighted at 4.

As noted above, the design of adders using the neural network concept has been described in Korean patent application No. 89-1369, filed in the Republic of Korea on Feb. 2, 1989, and also in U.S. patent application Ser. No. 07/473654, filed on Feb. 1, 1990 which was allowed on Nov. 13, 1990. Since the latter allowed U.S. application has been incorporated by reference, no further description of neural network adders in the present application is believed to be necessary.

A software simulation of the aforementioned circuit is described below for the third register 31 and the fourth register 32 when the value of the input operand is equal to "10110010" (see attached Chart A).

The first state of the third register is "00000001" and the first state of the fourth register is "000000001110010." Next [the answer-so-far of the third register 31 concatenated with "01" to its right] is subtracted from the contents of the fourth register excluding the rightmost 4 bits], obtaining the flag bit "1." During the subtraction, the contents of the fourth register are 2-bit shifted to the left. The flag bit is set to "1", the left part of the fourth register is overwritten, and "1" is concatenated to the content of the third register. The concatenated result is stored in the third register. The above process continues until the answer in the third register attains 8 bits. At the last stage, the root of the given operand is calculated as "1101.0101."

The integrated circuit design for computing square roots has been described in detail in the above paragraphs. An adder having more input lines can be easily constructed by combining 2-bit adders and 3-bit adders designed using the neural network concept.

An adder composed of 2-bit and 3-bit adders first outputs the carry bit of the most significant bit. Thus, computing speed of the adder constructed by combining other adders composed of neural network is comparable to the speed of an adder built of a single organization of transistors. It follows that the ripple speed of the carry bit of the adders

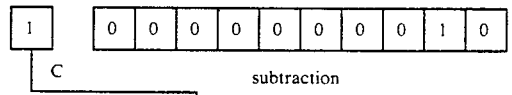

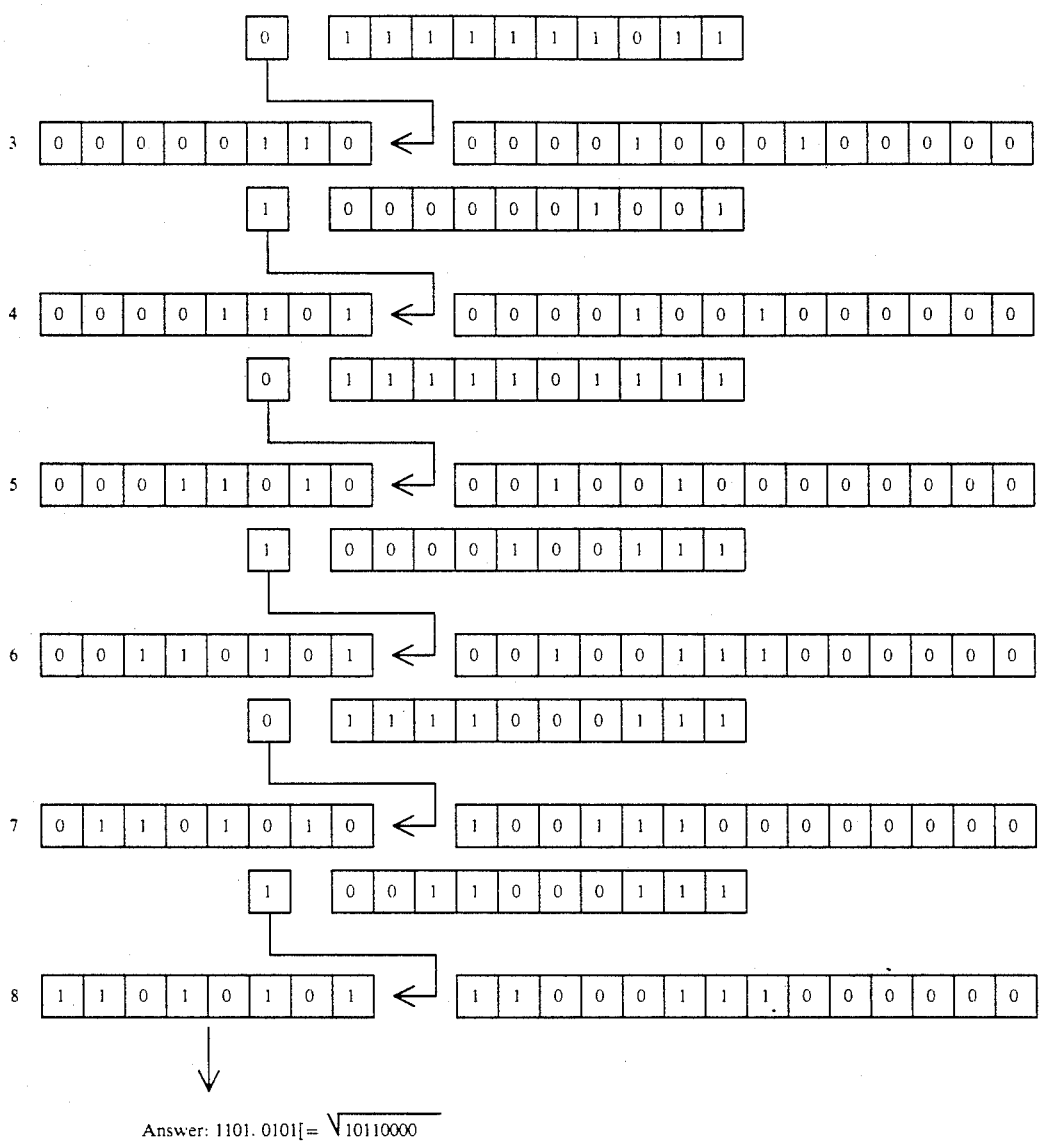

Answer: 1101. 0101[ = $\sqrt{10110000}$ designed using neural network concepts is far greater than that of a full adder. If the sensing ability of a neuron with respect to the analog value is excellent, a fast 4- or greater-bit adder can be implemented.

The present invention can compute square roots at high speed required for applications such as a servo control system for robots, and can be incorporated in digital signal processors and coprocessors as well.

What is claimed is:

1. An integrated circuit for computing a square root of an input member using neural network circuits, the integrated circuit comprising:

exponent means for computing the exponent of a square root of an input operand, said exponent means comprising a 5-bit adder and a first register, the 5-bit adder operating on the contents of the first register and the first register storing the result of the operation by the 5-bit adder;

first mantissa means for preprocessing the mantissa of the input operant and shifting the binary digits of the mantissa depending on an output from said exponent means;

second mantissa means for computing the square root of the output from said first mantissa means; and control means for controlling the timing of signals inputted to and outputted from said exponent means, said first mantissa means, and said second mantissa means so that a sequence of procedures for computing a square root can be executed in a predetermined sequence, said second mantissa means outputting the mantissa of the square root of the input operand and said exponent means outputting the exponent of the square root of the input operand after said predetermined sequence of procedures for computing a square root has been completed.

2. An integrated circuit as in claim 1, said control means comprising:

a first plurality of logic gates, each for outputting a signal after receiving multiple inputs;

S-R flip-flop means for outputting a signal according to a clock signal after receiving signals from said first plurality of logic gates;

a MOD-10 counter for supplying driving signals to said first plurality of logic gates; and a second plurality of logic gates for logically combining the signal outputted from said first plurality of logic gates and said S-R flip-flop means and for outputting signals depending on the value of the MOD-10 counter.

3. An integrated circuit as in claim 1, wherein said adder includes a 4- or more bit adder.

4. An integrated circuit as claimed in claim 1, said 5-bit adder comprising a combination of 2-bit and 3-bit adders.

5. An integrated circuit as in claim 4, each of said adders processing two groups of input binary digits, an augend and an addend, and a carry in and outputting an output sum and a carry out and each of said adders comprising:

a plurality of output buffer amplifiers corresponding to the output sum and the carry out resulting from said adding-processing;

augend input-synapse group means for coupling a first power source voltage to an input line of each of said plurality of output buffer amplifiers, according to a value of the augend, with a connecting weight value corresponding to each binary bit value of the binary augend input;

addend input-synapse group means for coupling the first power source voltage to the input line of each of said output buffer amplifiers, according to the value of the addend, with a connecting weight value corresponding to each binary bit value of the binary addend input;

carry input-synapse group means for coupling the first power source voltage to the input line of each of said output buffer amplifiers, according to a value of the carry in, with a connecting weight value of a reference weighting value according to the carry input;

first bias-synapse group means for coupling a second power source voltage to the input line of each of said output buffer amplifiers with the connecting weight value of a binary value of said output sum and carry bit;

second bias-synapse group means for coupling said first power source voltage to the input line of each of said output buffer amplifiers each with a connecting weight value of a reference weighting value;

an output feedback-synapse group means for coupling said second power source voltage to the input line of each lower bit output buffer amplifier, according to the value of each upper bit output buffer amplifier, with a connecting weight value corresponding to the binary output value of each upper bit output buffer amplifier; and means for inverting outputs of said output buffer amplifiers.

6. An integrated circuit as in claim 1, wherein said first mantissa means includes a second register for pre-processing the mantissa of an input operand and an 8-bit adder for storing the result of adding a predetermined number to the contents of said second register.

7. An integrated circuit as in claim 6, said 8-bit adder comprising a combination of 2-bit adders and 3-bit adders.

8. An integrated circuit as in claim 6, wherein said adders include a 4- or more bit adder.

9. An integrated circuit as in claim 7, each of said adders processing two groups of input binary digits, an augend and an addend, and a carry in and outputting an output sum and a carry out and each of said adders comprising:

a plurality of output buffer amplifiers corresponding to the output sum and the carry out resulting from said adding-processing;

augend input-synapse group means for coupling a first power source voltage to an input line of each of said plurality of output buffer amplifiers, according to a value of the augend, with a connecting weight value corresponding to each binary bit value of the binary augend input;

addend input-synapse group means for coupling the first power source voltage to the input line of each of said output buffer amplifiers, according to the value of the addend, with a connecting weight value corresponding to each binary bit value of the binary addend input;

carry input-synapse group means for coupling the first power source voltage to the input line of each of said output buffer amplifiers, according to a value of the carry in, with a connecting weight value of a reference weighting value according to the carry input;

first bias-synapse group means for coupling a second power source voltage to the input line of each of said output buffer amplifiers with the connecting weight value of a binary value of said output sum and carry bit;

second bias-synapse group means for coupling said first power source voltage to the input line of each of said output buffer amplifiers each with a connecting weight value of a reference weighting value;

an output feedback-synapse group means for coupling said second power source voltage to the input line of each lower bit output buffer amplifier, according to the value of each upper bit output buffer amplifier, with a connecting weight value corresponding to the binary output value of each upper bit output buffer amplifier; and means for inverting outputs of said output buffer amplifiers.

10. An integrated circuit as in claim 6, wherein said second mantissa means comprises:

a third register for storing the final result of square rooting the output of said first mantissa means;

a fourth register for storing the result of a repeated operation on data after receiving the data from said first mantissa means;

a 10-bit adder for outputting a signal to said third register after adding signals inputted from said third register and said fourth register; and flag means for transmitting a signal if a carry-bit of said 10-bit adder is an "1" and not transmitting a signal if the carry-bit is a "0."

11. An integrated circuit as in claim 10, said 10-bit adder comprising a combination of 2-bit adders and 3-bits adders.

12. An integrated circuit as in claim 11, wherein said adders include a 4- or more bit adder.

13. An integrated circuit as in claim 11, each of said adders processing two groups of input binary digits, an augend and an addend, and a carry in and outputting an output sum and a carry out and each of said adders comprising:

a plurality of output buffer amplifiers corresponding to the output sum and the carry out resulting from said adding-processing;

augend input-synapse group means for coupling a first power source voltage to an input line of each of said plurality of output buffer amplifiers, according to a value of the augend, with a connecting weight value corresponding to each binary bit value of the binary augend input;

addend input-synapse group means for coupling the first power source voltage to the input line of each of said output buffer amplifiers, according to the value of the addend, with a connecting weight value corresponding to each binary bit value of the binary addend input;

carry input-synapse group means for coupling the first power source voltage to the input line of each of said output buffer amplifiers, according to a value of the carry in, with a connecting weight value of a reference weighting value according to the carry input;

first bias-synapse group means for coupling a second power source voltage to the input line of each of said output buffer amplifiers with the connecting weight value of a binary value of said output sum and carry bit;

second bias-synapse group means for coupling said first power source voltage to the input line of each of said output buffer amplifiers each with a connecting weight value of a reference weighting value;

an output feedback-synapse group means for coupling said second power source voltage to the input line of each lower bit output buffer amplifier, according to the value of each upper bit output buffer amplifier, with a connecting weight value corresponding to the binary output value of each upper bit output buffer amplifier; and means for inverting outputs of said output buffer amplifiers.

* * * * *